United States Patent
Zhang et al.

(10) Patent No.: US 11,574,064 B2
(45) Date of Patent: *Feb. 7, 2023

(54) DATA INPUT METHOD AND APPARATUS AND USER EQUIPMENT

(71) Applicant: HUAWEI TECHNOLOGIES CO., LTD., Guangdong (CN)

(72) Inventors: Peng Zhang, Beijing (CN); Ji Wang, Beijing (CN); Hui Li, Helsinki (FI); Hongliang Xie, Shenzhen (CN); Xiaopu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

This patent is subject to a terminal disclaimer.

(21) Appl. No.: 17/085,539

(22) Filed: Oct. 30, 2020

(65) Prior Publication Data

US 2021/0049286 A1    Feb. 18, 2021

Related U.S. Application Data

(63) Continuation of application No. 16/131,548, filed on Sep. 14, 2018, now Pat. No. 10,831,905, which is a
(Continued)

(30) Foreign Application Priority Data

Mar. 15, 2016   (CN) .......................... 201610145990.7

(51) Int. Cl.
*G06F 21/60* (2013.01)
*G06F 21/83* (2013.01)
(Continued)

(52) U.S. Cl.
CPC .......... *G06F 21/604* (2013.01); *G06F 21/554* (2013.01); *G06F 21/83* (2013.01);
(Continued)

(58) Field of Classification Search
CPC ...... G06F 21/604; G06F 21/554; G06F 21/83; G06F 21/31; G06F 21/74; G06F 2221/034; G06F 2221/2105
See application file for complete search history.

(56) References Cited

U.S. PATENT DOCUMENTS 6,199,181 B1 *   3/2001   Rechef ................ H04L 63/0263
                                                           726/26
9,619,161 B2 *   4/2017   Kwon ................... G06F 3/0674
(Continued)

FOREIGN PATENT DOCUMENTS

CN     101008903 A  *  8/2007
CN     103136488       6/2013
(Continued)

OTHER PUBLICATIONS

Office Action issued in Indian Application No. 201837035338 dated Nov. 19, 2020, 8 pages.
(Continued)

*Primary Examiner* — Sher A Khan
(74) *Attorney, Agent, or Firm* — Fish & Richardson P.C.

(57) ABSTRACT

A data input method and apparatus, and user equipment are provided. The method includes: when it is determined that an operation of a user on the user equipment UE is not performed in a preset display area, deliver an event corresponding to the operation to a first operating environment for processing, where the preset display area runs in a second operating environment of the UE, and the second operating environment has a higher security level than the first operating environment. This can better improve security of an event generated when the user operates a program that runs in a Normal World of the user equipment, and can directly operate an event that runs in the Normal World.

19 Claims, 9 Drawing Sheets

Related U.S. Application Data continuation of application No. PCT/CN2017/075643, filed on Mar. 3, 2017.

(51) Int. Cl.
 *G06F 21/55* (2013.01)
 *G06F 21/74* (2013.01)
 *G06F 21/31* (2013.01)

(52) U.S. Cl.
 CPC .............. *G06F 21/31* (2013.01); *G06F 21/74* (2013.01); *G06F 2221/034* (2013.01); *G06F 2221/2105* (2013.01)

(56) References Cited

U.S. PATENT DOCUMENTS

| | | | | |
|---|---|---|---|---|
| 9,734,313 | B2* | 8/2017 | Chu | G06F 21/31 |
| 10,754,967 | B1* | 8/2020 | Arora | G06F 21/74 |
| 2001/0043198 | A1* | 11/2001 | Ludtke | G06F 3/04847 345/173 |
| 2002/0073034 | A1* | 6/2002 | Wagner | G06Q 30/0277 705/51 |
| 2003/0225556 | A1* | 12/2003 | Zeidman | G06F 30/33 703/14 |
| 2004/0156068 | A1* | 8/2004 | Yoshida | H04N 1/32363 358/1.16 |
| 2004/0226041 | A1* | 11/2004 | Smith | G06F 3/14 345/531 |
| 2007/0101297 | A1* | 5/2007 | Forstall | G06F 3/0482 715/835 |
| 2007/0266444 | A1 | 11/2007 | Segal | |
| 2008/0209212 | A1* | 8/2008 | Ditzman | G06F 21/60 713/167 |
| 2008/0275992 | A1* | 11/2008 | Basty | H04W 76/10 709/227 |
| 2013/0145475 | A1 | 6/2013 | Ryu et al. | |
| 2014/0089679 | A1* | 3/2014 | Goffmann | G06F 21/12 713/190 |
| 2014/0096222 | A1* | 4/2014 | Colnot | G06F 21/74 726/5 |
| 2014/0101755 | A1 | 4/2014 | Tang | |
| 2014/0165216 | A1 | 6/2014 | Kwag et al. | |
| 2014/0281560 | A1* | 9/2014 | Ignatchenko | H04L 9/0897 713/181 |
| 2014/0298026 | A1 | 10/2014 | Isozaki et al. | |
| 2015/0138608 | A1 | 5/2015 | Turner et al. | |
| 2015/0185980 | A1* | 7/2015 | An | G06F 3/0484 715/803 |
| 2015/0324615 | A1 | 11/2015 | Matsumoto et al. | |
| 2015/0371051 | A1 | 12/2015 | Chang et al. | |
| 2016/0088471 | A1* | 3/2016 | Feng | H04L 9/3226 705/73 |
| 2016/0239649 | A1* | 8/2016 | Zhao | H04W 12/065 |
| 2016/0253651 | A1* | 9/2016 | Park | G06Q 20/34 705/39 |
| 2018/0232540 | A1 | 8/2018 | Matveev et al. | |
| 2018/0276352 | A1 | 9/2018 | Yao | |

FOREIGN PATENT DOCUMENTS

| | | | | |
|---|---|---|---|---|
| CN | 103714276 | | 4/2014 | |
| CN | 104115152 | | 10/2014 | |
| CN | 104239783 | | 12/2014 | |
| CN | 104318182 | | 1/2015 | |
| CN | 104820573 | | 8/2015 | |
| CN | 104933361 | | 9/2015 | |
| CN | 105224403 A * | | 1/2016 | G06F 21/53 |
| CN | 105447406 A * | | 3/2016 | |
| CN | 105825128 | | 8/2016 | |
| EP | 2741229 | | 6/2014 | |
| EP | 2741229 A1 * | | 6/2014 | G06F 21/52 |
| WO | 2004046916 | | 6/2004 | |
| WO | WO-2004046916 A2 * | | 6/2004 | G06F 21/74 |
| WO | 2014141206 | | 9/2014 | |
| WO | WO-2014141206 A1 * | | 9/2014 | G06F 21/53 |

OTHER PUBLICATIONS

Extended European Search Report, dated Oct. 15, 2018, in European Application No. 17765734.3 (8 pp.).
International Search report dated Jun. 5, 2017 in corresponding International Patent Application No. PCT /CN2017 /075643.
International Search Report, dated Jun. 5, 2017, in International Application No. PCT/CN2017/075643 (4 pp.).
Office Action, dated Mar. 5, 2018, in Chinese Application No. 201610145990.7 (8 pp.).

* cited by examiner

DATA INPUT METHOD AND APPARATUS AND USER EQUIPMENT

CROSS-REFERENCE TO RELATED APPLICATIONS

This application is a continuation of U.S. patent application Ser. No. 16/131,548, filed on Sep. 14, 2018, which is a continuation of International Application No. PCT/CN2017/075643, filed on Mar. 3, 2017, which claims priority to Chinese Patent Application No. 201610145990.7, filed on Mar. 15, 2016. All of the afore-mentioned patent applications are hereby incorporated by reference in their entireties.

TECHNICAL FIELD

The present invention relates to the field of communications technologies, and in particular, to a data input method and apparatus, and user equipment.

BACKGROUND

With continuous development of communications technologies, user equipment (user equipment, UE) can provide an increasingly more powerful application function, and increasingly more data such as personal property or privacy is stored in the user equipment.

The user equipment continuously develops, and system functions of the user equipment also increase continuously. With an increase in the system functions, security vulnerability inevitably occurs in a system of the user equipment. An attacker may intrude the system of the user equipment by using the security vulnerability, to obtain data stored in the user equipment, and security of a user input operation and terminal displaying cannot be ensured. For example, a user implements payment by using user equipment. When the user is entering data at an interface provided by the user equipment, an attacker may intercept an input event of the user and content displayed on the user equipment to obtain the data entered by the user. The attacker may then analyze stored historical data corresponding to an application used for the payment to obtain an account of the user. When the attacker further obtains a password entered by the user into the user equipment, a severe risk is posed to wealth of the user. In view of this, the industry puts forward a TrustZone (Trust Zone) technology. In this technology, it is proposed that hardware composition of the user equipment is divided into a Secure World (secure world) and a Normal World (normal world), and data in the Secure World can be transmitted only by using a monitor (monitor). An operating system of the user equipment runs in the Normal World. A program that runs in the Secure World has a higher security level than a program that runs in the Normal World. The Secure World is isolated from the Normal World by using hardware. The Secure World has a right to access all data in the Normal World, but the Normal World has no right to access data in the Secure World. When the user equipment is started, the Secure World is first entered, and then a program in the Secure World is responsible for switching to the Normal World, and starting the operating system of the user equipment. Concepts of the Secure World and the Normal World are put forward in the TrustZone technology, to resolve a problem of data input security in the user equipment. A data input environment that runs in the Secure World is provided, and the user may operate an event such as entering an account or a password in the provided data input environment. However, in general, when related content is displayed or entered in the data input environment that runs in the Secure World, the displayed content usually covers the entire display area of the user equipment. When the user needs to operate another event, for example, when a pop-up window of a short message service message appears when the user is entering a user name and a password, and the user needs to view the short message service message, the system needs to quit the data input environment according to an instruction of the user for viewing the short message service message, and this leads to a loss of the previously operated event. Therefore, in the TrustZone technology, neither security of an event generated when the user operates a program that runs in the Normal World of the user equipment can be completely resolved, nor an event that runs in the Normal World can be directly operated.

SUMMARY

The present invention provides a data input method and apparatus, and user equipment, so that security of an event generated when a user operates a program that runs in a Normal World of the user equipment can be better improved, and an event that runs in the Normal World can be directly operated.

According to a first aspect, a data input method is provided and includes: when it is determined that an operation of a user on UE is not performed in a preset display area, delivering an event corresponding to the operation to a first operating environment for processing, where the preset display area runs in a second operating environment of the UE, and the second operating environment has a higher security level than the first operating environment. This can better improve security of an event generated when the user operates a program that runs in a Normal World of the user equipment, and directly operate an event that runs in the Normal World.

With reference to the first aspect, in a first possible implementation of the first aspect, the method further includes: receiving an operation of the user in an input area presented by a display unit for the user, and generating an event corresponding to the operation; determining whether the event generated when the user performs the operation in the input area is a secure input event; and if it is determined that the event generated when the user performs the operation in the input area is a secure input event, starting the preset display area, and presenting the preset display area to the user by using the display unit.

With reference to the first possible implementation of the first aspect, in a second possible implementation of the first aspect, the starting the preset display area includes: backing up a current event in the first operating environment; triggering an interrupt in the second operating environment; and starting the preset display area by using the interrupt in the second operating environment.

Determining is performed on a corresponding event generated when the user performs an operation in an input area that runs in the first operating environment, and whether the event is a secure input event is determined. When it is determined that the event is a secure input event, switching from the first operating environment to the second operating environment is performed, that is, the preset display area is presented to the user, so that a secure input time generated when the user performs an operation on the user equipment may be switched to the second operating environment for processing. In this case, security of the event generated when the user performs the operation on the user equipment can be better ensured.

With reference to any one of the first aspect, or the first to the second possible implementations of the first aspect, in a third possible implementation of the first aspect, the preset display area and the input area are simultaneously presented on a screen of the user equipment.

With reference to the first aspect, in a fourth possible implementation of the first aspect, the delivering an event corresponding to the operation to a first operating environment for processing includes: storing the event corresponding to the operation in a shared storage area, where the shared storage area is a storage area that is shared by the first operating environment and the second operating environment; and triggering an interrupt in the first operating environment, to deliver the event stored in the shared storage area to the first operating environment for processing.

With reference to the fourth possible implementation of the first aspect, in a fifth possible implementation of the first aspect, the triggering an interrupt in the first operating environment, to deliver the event stored in the shared storage area to the first operating environment for processing includes: triggering the interrupt in the first operating environment, and invoking a daemon thread in the first secure environment, so as to deliver, by using the daemon thread, the event stored in the shared storage area to the first operating environment for processing.

With reference to any one of the first aspect, or the first to the fifth possible implementation of the first aspect, in a sixth possible implementation of the first aspect, before it is determined that the operation of the user on the user equipment UE is not performed in the preset display area, the method further includes: when it is determined that the event corresponding to the operation is a secure input event, displaying the preset display area, so that the user performs the operation in the preset display area, where the secure input event is a data input event with an authority verification attribute.

With reference to any one of the first aspect, or the first to the sixth possible implementation of the first aspect, in a seventh possible implementation of the first aspect, after the delivering an event corresponding to the operation to a first operating environment for processing, the method further includes: hiding the preset display area. This can improve flexibility of a user operation.

With reference to any one of the first aspect, or the first to the sixth possible implementation of the first aspect, in an eighth possible implementation of the first aspect, the preset display area includes a formatted input edit box.

With reference to the eighth possible implementation of the first aspect, in a ninth possible implementation of the first aspect, the formatted input edit box includes at least one of the following: a specified input type may be an input type such as nine-key numeric type, a nine-key Chinese character type, a nine-key alphabetic type, a number and Chinese character hybrid type. This can improve convenience of a user operation.

According to a second aspect, a data input apparatus is provided. The data input apparatus has a function of implementing an action of a terminal in any method design according to the first aspect and the first to the eighth possible implementations of the first aspect. The function may be implemented by hardware, or may be implemented by hardware executing corresponding software. The hardware or software includes one or more modules corresponding to the function.

According to a third aspect, a user terminal is provided. The user terminal has a function of implementing an action of a terminal in any method design according to the first aspect and the first to the eighth possible implementations of the first aspect. The function may be implemented by hardware, or may be implemented by hardware executing corresponding software. The hardware or software includes one or more modules corresponding to the function.

With reference to the third aspect, in a first possible implementation of the third aspect, a structure of the terminal includes a memory and a processor. The memory is configured to store a group of programs, and the processor is configured to invoke the programs stored in the memory, to execute the method in any one of the first aspect, or the first to the eighth possible implementations of the first aspect.

According to a fourth aspect, a computer storage medium is provided, and is configured to store a computer software instruction used by a data input apparatus, and the computer software instruction includes a program designed to execute the foregoing aspects.

By using the foregoing technical solutions, when it is determined that the operation of the user on the UE is not performed in the preset display area, the event corresponding to the operation is delivered to the first operating environment for processing. In this case, when the user operates a program that runs in a Normal World of the user equipment, even if the user needs to process another non-secure event, security of an event generated when the user operates the program that runs in the Normal World of the user equipment can be ensured, and an event that runs in the Normal World can be directly operated.

DESCRIPTION OF EMBODIMENTS

To resolve a problem that in a TrustZone technology, neither security of an event generated when a user operates a program that runs in a Normal World of user equipment can be completely resolved, nor an event that runs in the Normal World can be directly operated, in technical solutions provided in the present invention, when it is determined that an operation of a user on UE is not performed in a preset display area, an event corresponding to the operation is delivered to a first operating environment for processing. The preset display area runs in a second operating environment of the UE, and the second operating environment has a higher security level than the first operating environment. Therefore, security of the event generated when the user operates the program that runs in the Normal World of the user equipment can be better improved, and the event that runs in the Normal World can be directly operated.

The following expounds main implementation principles, specific implementations, and corresponding available beneficial effects of the technical solutions in the embodiments of the present invention with reference to various accompanying drawings.

Figure 1A:
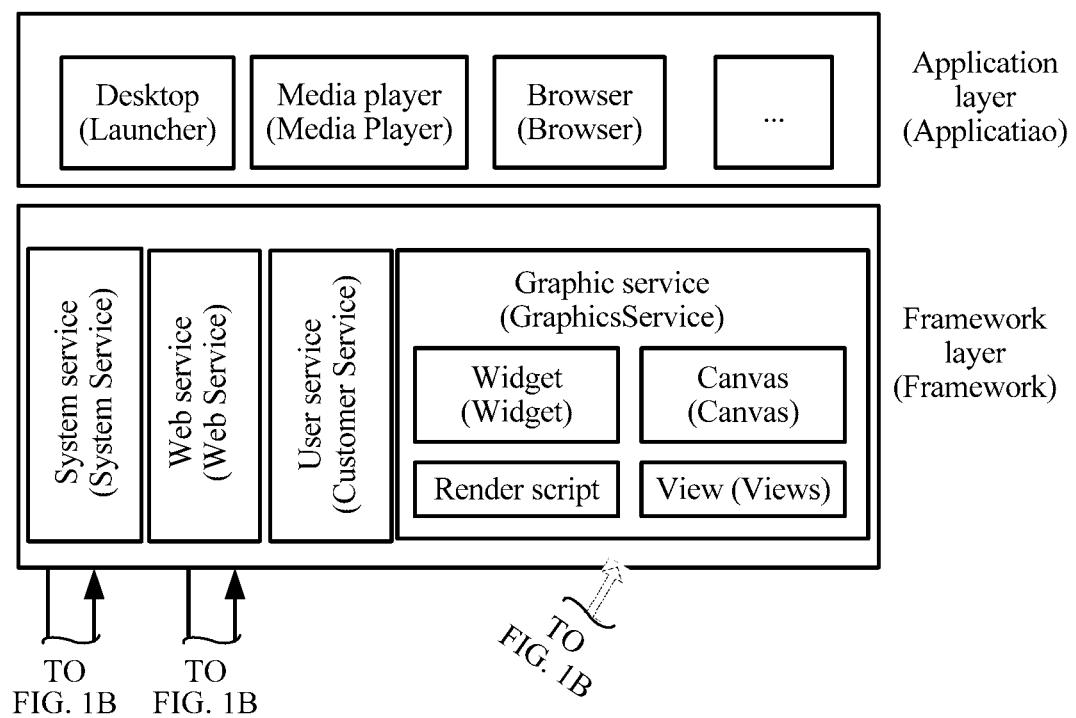
FIG. 1A and FIG. 1B are a schematic diagram of a logical structure of a computing node to which a data input method is applied according to an embodiment of the present invention.
Figure 1B:
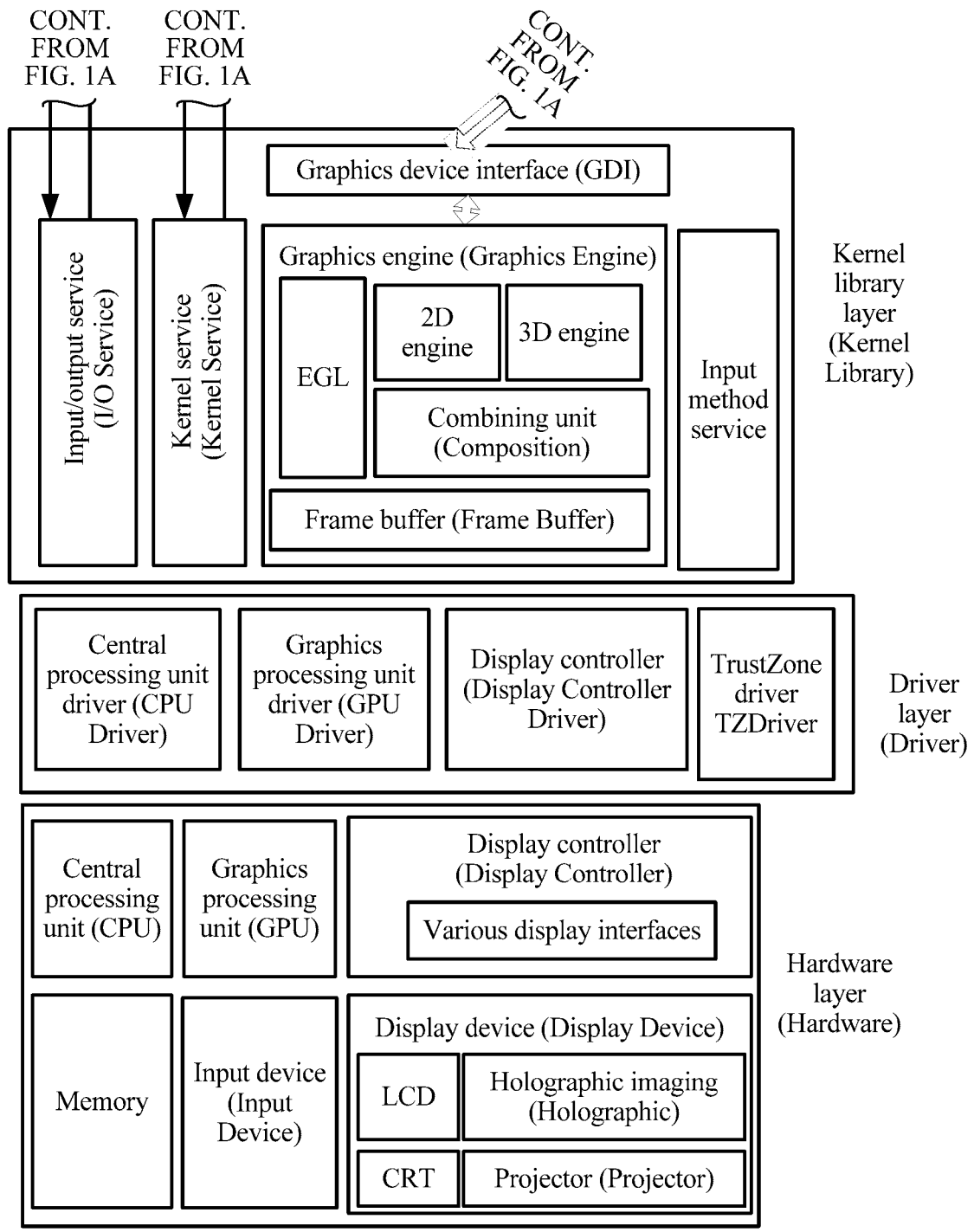

In a technical solution put forward in an embodiment of the present invention, FIG. 1A and FIG. 1B are used as an example to describe a logical structure of a computing node to which a data input method provided in this embodiment of the present invention is applied. The computing node may be user equipment, and the user equipment may be specifically a desktop computer, a notebook computer, a smartphone, a tablet, or the like. As shown in FIG. 1, a hardware layer of the user equipment includes a central processing unit (Center Processing Unit, CPU), a graphics processing unit (Graphic Processing Unit, GPU), and the like. Certainly, the hardware layer of the user equipment may further include a memory, an input/output device (Input Device), a network interface, and the like. The input device may include a keyboard, a mouse, a touchscreen, and the like. The output device may include a display device such as a liquid crystal display (Liquid Crystal Display, LCD), a cathode-ray tube (Cathode Ray Tube, CRT), holographic imaging (Holographic), or a projector (Projector). An operating system (such as Android) and some application programs may run above the hardware layer. A kernel library layer is a core part of the operating system, and includes an input/output service, a kernel service, a graphics device interface, a graphics engine (Graphics Engine) that implements graphics processing of the CPU and the GPU, and the like. The graphics engine may include a 2D engine, a 3D engine, a combining unit (Composition), a frame buffer (Frame Buffer), and the like. The kernel library layer further includes an input method service. The input method service includes an input method service embedded in a terminal. The input method service further includes the data input method provided in this embodiment of the present invention. In addition, the terminal further includes a driver layer, a framework layer, and an application layer. The driver layer may include a CPU driver (driver), a GPU driver, a display controller driver, a TrustZone driver (Trust Zone Driver), and the like. The framework layer may include a graphic service (Graphic Service), a system service (System service), a web service (Web Service), a user service (Customer Service), and the like. The graphic service may include a widget (Widget), a canvas (Canvas), a view (Views), a render script, and the like. The application layer may include a desktop (launcher), a media player (Media Player), a browser (Browser), and the like.

In a TrustZone technology, when hardware and program instructions of user equipment run, there may be two operating environments: a secure operating environment and a non-secure operating environment. The non-secure operating environment may also be referred to as a Normal World, and is corresponding to a first operating environment put forward in this embodiment of the present invention. The secure operating environment may also be referred to as a Secure World, and is corresponding to a second operating environment put forward in this embodiment of the present invention. A program and hardware of the user equipment that run in the secure operating environment have a higher security level than a program and hardware of the user equipment that run in the non-secure operating environment. The Secure World may also be a virtual operating environment isolated from the operating system of the user equipment.

Figure 2:
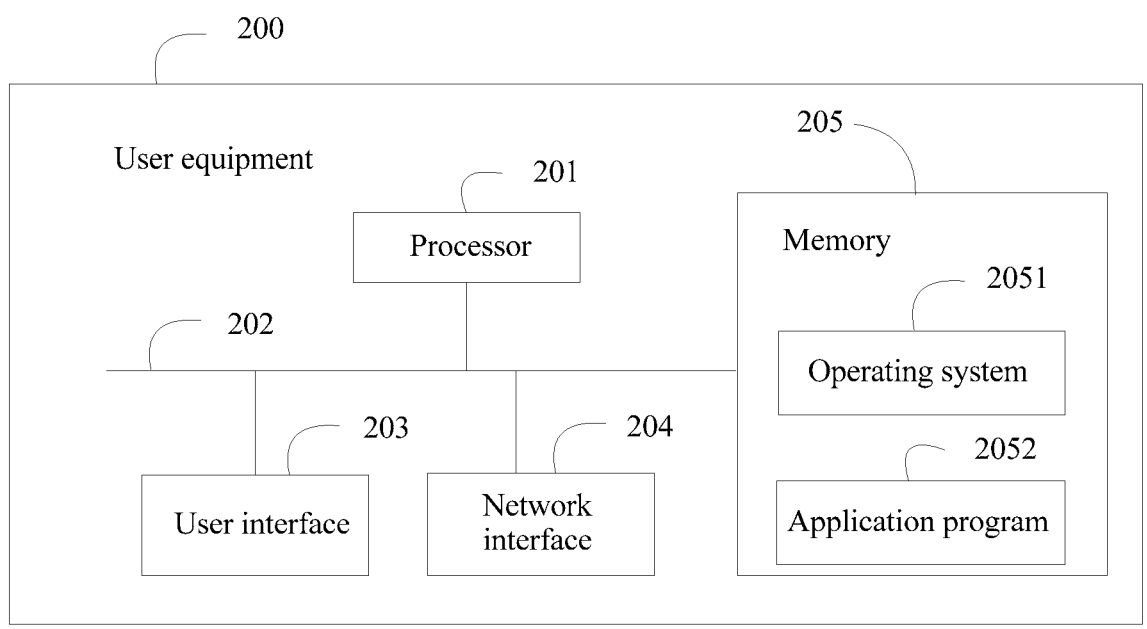
FIG. 2 is a schematic diagram of structural composition of user equipment according to an embodiment of the present invention.

User equipment to which a data input method put forward in an embodiment of the present invention is applied is shown in FIG. 2. The user equipment 200 includes: at least one processor 201, at least one network interface 204 or another user interface 203, a memory 205, and at least one communications bus 202. The communications bus 202 is configured to implement connection and communication between these components. Optionally, the user equipment 200 includes the user interface 203 that includes a display (for example, the LCD, the CRT, the holographic imaging (Holographic), or the projector (Projector) shown in FIG. 1A and FIG. 1B), a keyboard or a click device (for example, a mouse, a trackball (trackball), a touchpad, or a touchscreen), and the like.

The memory 205 may include a read-only memory and a random access memory, and provide the processor 201 with a program instruction and data that are stored in the memory 205. A part of the memory 205 may further include a nonvolatile random access memory (NVRAM).

In some implementations, the memory 205 stores the following elements: an executable module or a data structure, or a subset thereof, or an extended set thereof.

An operating system 2051 includes various system program instructions. The program instructions may run on the framework layer, the kernel library layer, the driver layer, and the like shown in FIG. 1A and FIG. 1B, and are used to implement various basic services and process hardware-based tasks.

In the technical solution put forward in this embodiment of the present invention, the operating system may run in both a first operating environment and a second operating environment whose security level is higher than the first operating environment.

An application program 2052 includes various application programs, for example, the desktop (launcher), the media player (Media Player), the browser (Browser), and an input method application that are shown in FIG. 1A and FIG. 1B, and the various application programs are used to implement various application services.

The various application programs in the application program 2052 may be applied to the first operating environment, or may run in the second operating environment. In the technical solution put forward in this embodiment of the present invention, the application program 2052 stores a program instruction that implements the data input method, and the program instruction runs in the second operating environment.

In this embodiment of the present invention, the memory 205 may also be referred to as a storage area, and is configured to store a program of the data input method, and store the operating system.

The processor 201 invokes the program instruction stored in the memory 205, and according to the obtained program instruction, the processor 201 is configured to: when it is determined that an operation of a user on the UE is not performed in a preset display area, deliver an event corresponding to the operation to the first operating environment for processing.

Optionally, in an embodiment, the processor 201 is further configured to: when it is determined that the event corresponding to the operation is a secure input event, display the preset display area, so that the user performs the operation in the preset display area. The secure input event is a data input event with an authority verification attribute.

Further, the processor 201 is specifically configured to store the event corresponding to the operation in a shared storage area. The shared storage area is a storage area that is shared by the first operating environment and the second operating environment.

The user equipment further includes an interrupt in the first operating environment (which is not shown in FIG. 2). The processor 201 triggers the interrupt in the first operating environment, and the interrupt in the first operating environment delivers the event stored in the shared storage area to the first operating environment for processing. Further, the processor 201 is specifically configured to: trigger the interrupt in the first operating environment, and invoke a daemon thread in the first secure environment, so as to deliver, by using the daemon thread, the event stored in the shared storage area to the first operating environment for processing.

Further, the processor 201 is specifically configured to hide the preset display area.

Figure 3:
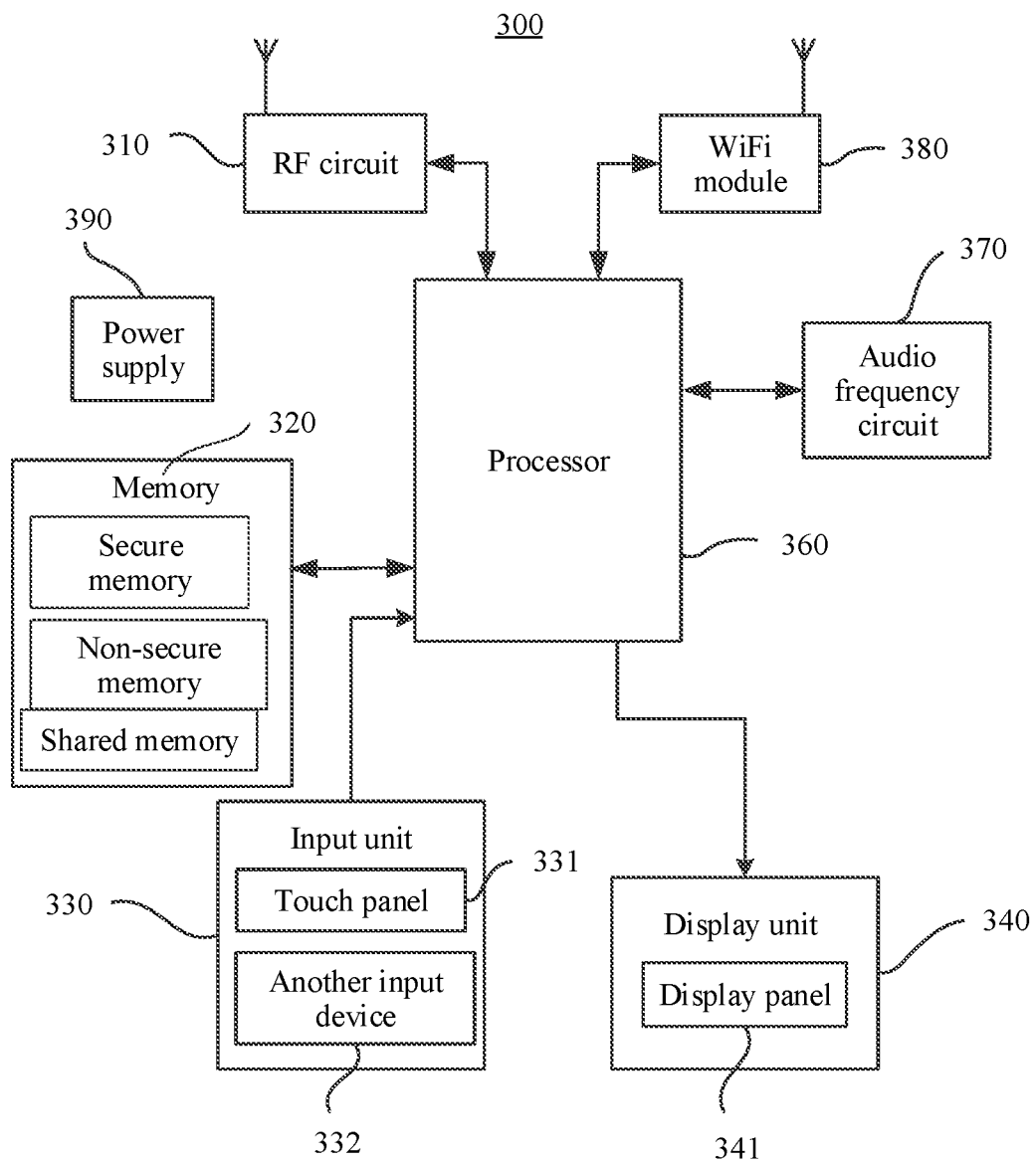
FIG. 3 is a schematic diagram of structural composition of user equipment according to an embodiment of the present invention.

User equipment to which a data input method put forward in an embodiment of the present invention is applied may be a mobile phone, a tablet, a personal digital assistant (Personal Digital Assistant, PDA), or the like. Referring to FIG. 3, FIG. 3 is a schematic diagram of structural composition of user equipment 300.

The user equipment 300 mainly includes a memory 320, a processor 360, and an input unit 330. The input unit 330 is configured to receive an event generated when a user performs an operation on a terminal. The memory 320 is configured to store program instructions of an operating system and various application programs.

In a technical solution put forward in this embodiment of the present invention, a first operating environment and a second operating environment are put forward. Correspondingly, the memory 320 may be divided into a secure memory (which may also be referred to as a secure storage area), a non-secure memory (which may also be referred to as a non-secure storage area), and a shared memory (which may also be referred to as a shared storage area). The non-secure memory is disposed in the first operating environment, and the secure memory is disposed in the second operating environment. The second operating environment has a higher security level than the first operating environment. A processor or an interrupt disposed in the first operating environment cannot directly access the secure memory in the second operating environment. A processor or an interrupt in the second operating environment may access the non-secure processor disposed in the first operating environment, and access the non-secure storage area. For the shared memory, data stored in the shared memory is data that may be accessed by processors or interrupts in both the first operating environment and the second operating environment. That is, the processors or the interrupts in the first operating environment and the second operating environment may access the shared memory to obtain the data in the shared memory.

It may be understood that for a specific implementation function of the processor 360, reference may be made to the detailed descriptions of the processor 201, and details are not described herein again.

The memory 320 may be a memory of the user equipment 300. The memory may be divided into three storage spaces. The three storage spaces are separately corresponding to a secure memory disposed in the first operating environment, a non-secure memory disposed in the second environment, and a shared memory that may be accessed by application programs or hardware in both the first operating environment and the second operating environment. The secure memory, the non-secure memory, and the shared memory may have spaces of a same size, or may have spaces of different sizes according to different stored data input events.

The input unit 330 of the user equipment may be configured to receive number or character information that is entered by the user, so as to generate a signal input related to user settings or function control of the user equipment 300. Specifically, in this embodiment of the present invention, the input unit 330 may include a touch panel 331. The touch panel 331 may collect an operation (such as an operation performed by the user on the touch panel 331 by using any proper object or accessory, such as a finger or a stylus) performed by the user on the touch panel 331, and drive, according to a preset program instruction, a corresponding apparatus connected to the touch panel 331. Optionally, the touch panel 331 may include two parts: a touch detection apparatus and a touch controller. The touch detection apparatus detects a touch location of the user, detects a signal brought by the touch operation, and sends the signal to the touch controller. The touch controller receives touch information received from the touch detection apparatus, converts the touch information into touch coordinates, and sends the touch coordinates to the processor 360. The touch controller can further receive and execute a command sent by the processor 360. In addition, the touch panel 331 may be implemented by using multiple types such as a resistive type, a capacitive type, an infrared ray, and a surface acoustic wave. In addition to the touch panel 331, the input unit 330 may further include another input device 332. The another input device 332 may include but is not limited to one or more of a physical keyboard, a functional key (such as a volume control key or an on/off key), a trackball, a mouse, a joystick, or the like.

The user equipment 300 may further include a display unit 340. The display unit 340 may be configured to display information entered by the user or information provided for the user and various menu interfaces of the user equipment 300. The display unit 340 may include a display panel 341. Optionally, the display panel 341 may be configured in a form such as a liquid crystal display (Liquid Crystal Display, LCD) or an organic light-emitting diode (Organic Light-Emitting Diode, OLED).

Referring to FIG. 3, in this embodiment of the present invention, the touch panel 331 covers the display panel 341, to form a touch display screen. The touch display screen provides a preset display area for the user. After detecting a touch operation on or near the touch display screen, the touch display screen 7 transmits the touch operation to the processor 360 to determine a type of a touch event. Then the processor 360 provides a corresponding visual output on the touch display screen according to the type of the touch event.

In this embodiment of the present invention, the touch display screen includes different display areas. Each display area may include at least one interface element such as an icon of an application program and/or a widget home screen widget.

The processor 360 is a control center of the user equipment 300, is connected to each part of an entire mobile phone by using various interfaces and lines, and performs various functions of the user equipment 300 and data processing by running or executing the software program and/or the module that are/is stored in the memory 320, so as to perform overall monitoring on the user equipment 300.

It may be understood that during initiation, the processor 360 first enters the second operating environment, and performs initialization setting of the operating system in the second operating environment, so as to ensure security of the operating system.

The initialization setting includes initialization of a monitor mode. In a system initiation process, all memories (the secure memory, the non-secure memory, and the shared memory) in the operating system of the user equipment are in the second operating environment. Then an operating system image that needs to run in the first operating environment is loaded into the non-secure memory, and then the system image in the first operating environment runs.

Optionally, the user equipment 300 may further include an RF circuit 310, a WiFi module 380 that is configured to provide a wireless connection, a power supply 390, and an audio frequency circuit 370 that is configured to provide sound input and output.

Based on the user equipment 300 with the touch display screen shown in FIG. 3, in a solution put forward in this embodiment of the present invention, operating environments of a data input method are divided into a Normal World (a first operating environment) and a Secure World (a second operating environment). For hardware composition, one user equipment has only one set of hardware structures. However, in the hardware, security attributes of some hardware can be dynamically set, but security attributes of the other hardware are fixed. Security of the entire system is obtained by dividing a hardware resource and a software resource of a system on chip (System on Chip, SoC) into the two worlds. The Secure World and the Normal World are a Secure World corresponding to a secure subsystem and a Normal World corresponding to another subsystem.

Figure 4:
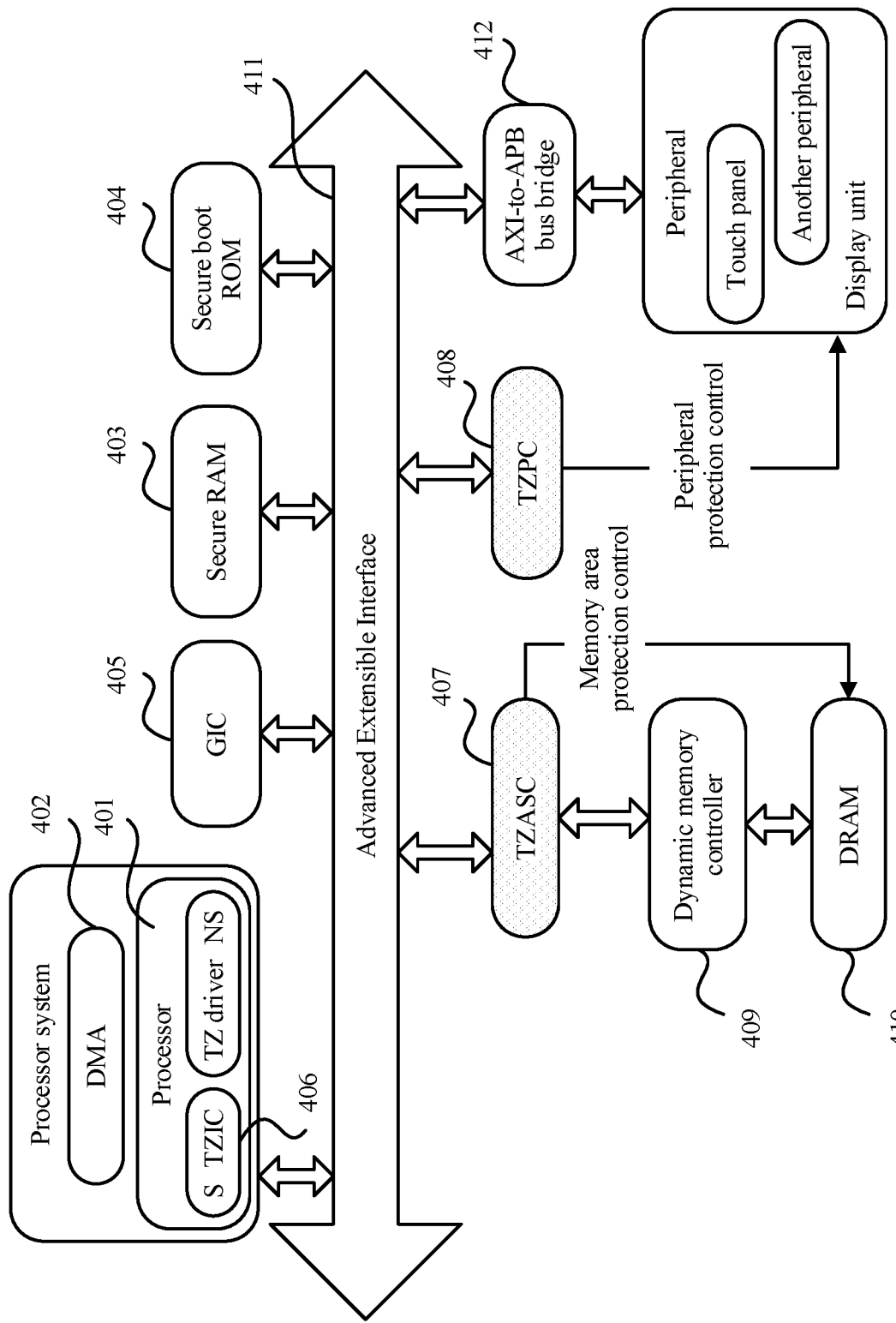
FIG. 4 is a schematic structural diagram of hardware composition of a Secure World of a data input system according to an embodiment of the present invention.

As shown in FIG. 4, the SoC system includes a processor (Core) 401. In a processor architecture, each physical processor core provides two virtual cores: a non-secure (Non-secure, NS) core and a secure (Secure) core. A mechanism of switching between the non-secure core and the secure core is referred to as a monitor (monitor) mode. The non-secure core can access only a system resource of the NS, but the secure core can access all resources in the user equipment. The SoC further includes direct memory access (Direct Memory Access, DMA) 402, a secure random access memory (Secure Random Access Memory, Secure RAM) 403, a secure boot read only memory (Secure Boot Read Only Memory, Secure Boot ROM) 404, a generic interrupt controller (Generic Interrupt Controller, GIC) 405 that is integrated with TrustZone support and that can work in the first operating environment and the second operating environment, a TrustZone interrupt controller (Trust Zone Interrupt Controller, TZIC) 406 that may be independently implemented, and the like. The SoC further includes a TrustZone address space controller (Trust Zone Address Space Controller, TZASC) 407 that is configured to support a secure interrupt, a TrustZone protection controller (Trust Zone Protection Controller, TZPC) 408, a dynamic memory controller (Dynamic Memory Controller, DMC) 409, a dynamic RAM (Dynamic RAM) 410, and the like. The TZPC is configured to set a security attribute of a peripheral. For example, the TZPC may set an attribute of the display unit to secure. In this case, an operation in the first operating environment cannot access a device that is set as secure. The TZASC is configured to control classification of a security attribute of the DRAM. The TZASC may set a part of the DRAM as secure, and set the other part of the DRAM as non-secure. If the processor in the first operating environment initiates an access request to the secure memory, the access request is refused. Access of DMA in the first operating environment to the secure memory is refused, and this ensures that the secure memory is not accessed by any operating system or hardware in the first operating environment. The GIC is responsible for controlling all interrupt information, and the GIC may set some interrupts as secure, and set some interrupts as normal.

SoC components are connected to each other by using an Advanced Extensible Interface (Advanced eXtensible Interactive, AXI) 411. The SoC communicates with the peripheral by using an Advanced Extensible Interface to Advanced Peripheral Bus Bridge (Advanced eXtensible Interactive to Advanced Peripheral Bus Bridge, AXI2APB) bridge 412. The AXI2APB may sense a security attribute of an event that currently accesses the peripheral. When an event in the first operating environment accesses a peripheral whose attribute is set to secure, the AXI2APB refuses this access. A secure RAM and a secure ROM are isolated by using a software and hardware mechanism, and the secure RAM and the secure ROM are configured to store an operating system that runs in the second operating environment.

In the data input method put forward in this embodiment of the present invention, the SoC system is initiated after powered on. During starting, the system first enters the second operating environment, and then performs initiation setting in the second operating environment. The initiation setting includes initiation of the operating system in the second operating environment. In a process of initiating the system, all memories in the operating system of the user equipment are in the second operating environment. Then the operating system image that needs to run in the first operating environment is loaded to a memory, and some memories are allocated to the first operating environment. Security attributes of the some memories allocated to the first operating environment are set to non-secure. Then the system image in the first operating environment runs.

Figure 5:
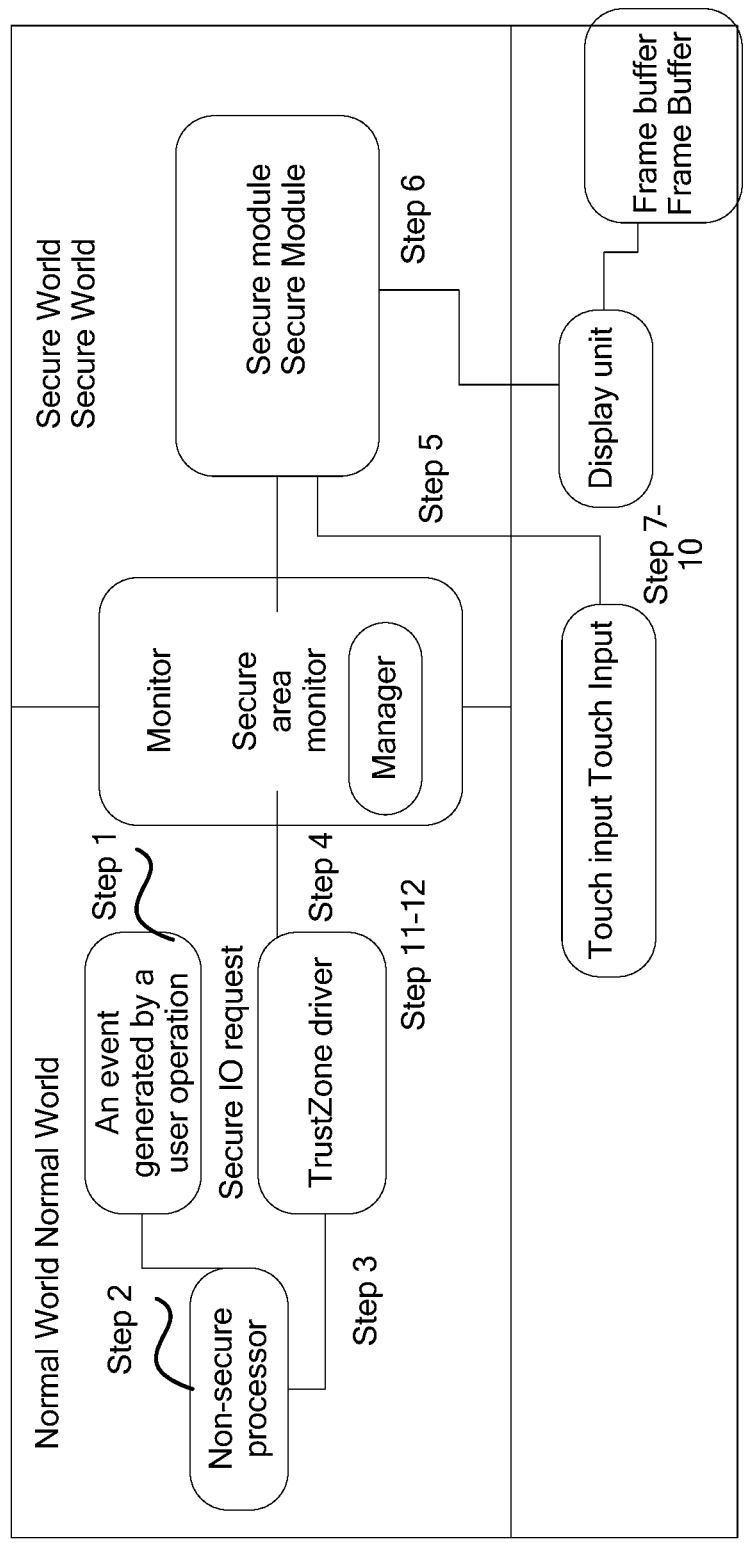
FIG. 5 is a flowchart of a data input method according to an embodiment of the present invention.

The following describes in detail a processing procedure of a data input method put forward in an embodiment of the present invention. As shown in FIG. 5, a specific implementation process of delivering an event from a first operating environment to a second operating environment for processing is first described.

Step 1: A display unit presents an input area to a user, and the user performs an operation in the input area to generate an event corresponding to the operation.

Detailed description is provided by using an example in which the user enters a payment password of a numeric type in the input area presented by the display unit. The display unit may include a touch panel of a touch nature. The user touches the touch panel, enters a payment account in the input area, and continues to enter a payment password after entering the payment account. A processor receives an event generated when the user operates the touch panel. Specifically, a non-secure core in the first operating environment may receive the event generated when the user operates the touch panel.

Step 2: The processor determines whether the event generated when the user operates performs the operation in the input area is a secure input event. If it is determined that the event is not a secure input event, the user continues to perform the operation in the input area to generate an event corresponding to the operation, and the processor continues to process the event.

The secure input event is an event generated only when the user enters a password with an authority verification attribute. For example, in a payment application, after the user enters a user name, the user needs to continue to enter a payment password corresponding to the user name, and after the payment password and the user name are matched, payment is completed. An event corresponding to an operation that the user continues to enter the payment password corresponding to the user name is a secure input event.

Figure 6:
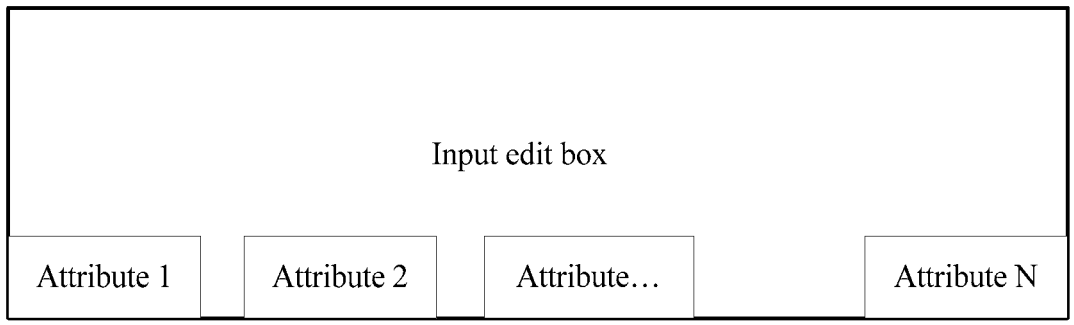
FIG. 6 is a schematic diagram of an input edit box according to an embodiment of the present invention.

A security attribute of the input area presented by the display unit may be edited in advance. The input area is set to a non-secure display area that runs in the first operating environment and a secure display area that runs in the second operating environment. For example, in a specific implementation process, as shown in FIG. 6, an input area in the first operating environment may be an input edit box with a fixed shape and size. The input edit box may be in any shape. As shown in FIG. 6, a square shape is only used as an example. During setting, a security attribute may be added to the input edit box, and the security attribute is set. For example, the secure attribute is set to a numeric attribute. That is, when a received event operated by the user in the input edit box is triggering numeric input, it is determined that the event is a secure input event.

Detailed description is provided below by still using the example in which the user enters the payment password of the numeric type. When the user is about to enter the payment password of the numeric type, for example, the payment password of the user is 12345678, when the user triggers a number, it is determined that a data input event operated by the user is a secure input event.

Step 3: The processor triggers a TZ driver when it is determined that a data input event operated by the user is a secure input event. The TZ driver triggers a monitor (monitor) mode used for switching between the first operating environment and the second operating environment, and the processor enters the second operating environment by using a monitor.

Step 4: The processor backs up a current event in the first operating environment in the monitor mode. The processor triggers an interrupt in the first operating environment, and stores the currently determined secure input event in a shared storage area. After saving of the secure input event is completed, an interrupt in the second operating environment is triggered in the monitor mode, and a processor in the second operating environment, that is, a secure core, is triggered by using the interrupt in the second operating environment.

Step 5: The secure core (that is, the processor in the second operating environment) triggers the interrupt, starts a preset display area, and presents the preset display area to the user by using the display unit. A following operation of the user is performed in the preset display area.

Figure 7:
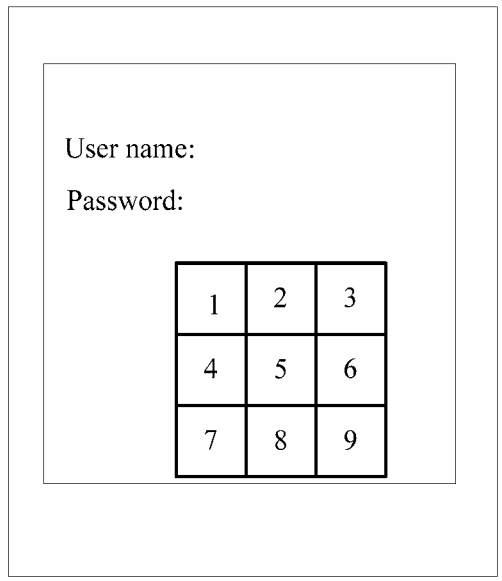
FIG. 7 is a schematic diagram of a preset display area and an input area according to an embodiment of the present invention.
Figure 8:
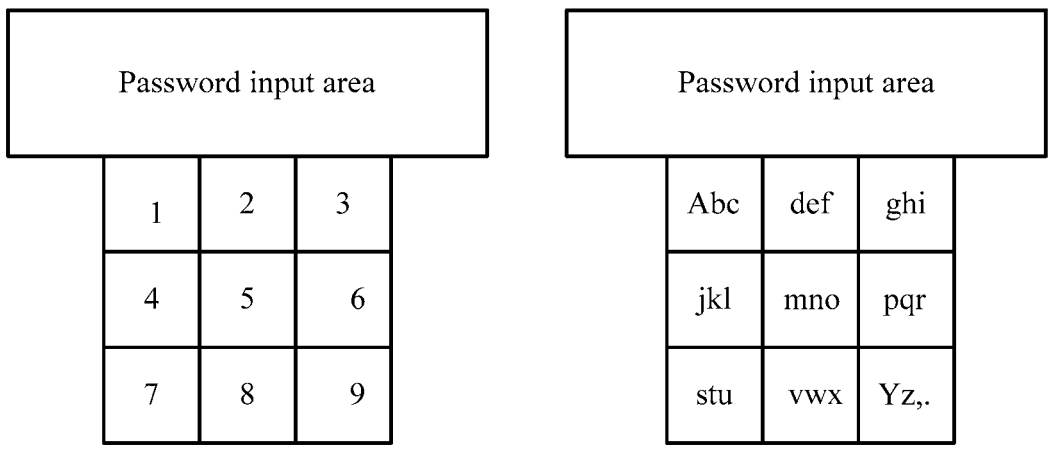
FIG. 8 is a schematic diagram of a specified input type according to an embodiment of the present invention.

The preset display area runs in the second operating environment. The preset display area may be a part of a screen of the user equipment, and the user may perform an input operation in the preset display area. Correspondingly, the preset display area may be an input edit box that has a fixed shape and size and has a security attribute. As shown in FIG. 7, the preset display area is started. The preset display area and the input area may be simultaneously presented on the screen of the user equipment. The preset display area may cover a part of the input area and overlap the part of the input area. The preset display area may include a specified input type. As shown in FIG. 8, the specified input type may be an input type such as a nine-key numeric type, a nine-key Chinese character type (which is not shown in FIG. 8), a nine-key alphabetic type, a number and Chinese character hybrid type (which is not shown in FIG. 8).

For example, the preset display area is started, and it is assumed that the specified input type is a display area of the nine-key numeric type. In the display unit, the display area of the nine-key numeric type is presented to the user, and the user enters the payment password in the preset display area of the nine-key numeric type.

Step 6: The processor delivers the event to the second operating environment for processing.

By using the foregoing technical solution, determining is performed on a corresponding event generated when the user performs an operation in the input area that runs in the first operating environment, whether the event is a secure input event is determined, and when it is determined that the event is a secure input event, switching from the first operating environment to the second operating environment is performed, that is, the preset display area is presented to the user, so that a secure input time generated when the user performs an operation on the user equipment may be switched to the second operating environment for processing. In this case, security of an event generated when the user performs the operation on the user equipment can be better ensured.

As shown in FIG. 5, a specific implementation process of delivering an event from a second operating environment to a first operating environment for processing is then described.

Step 7: A user performs an operation in a preset display area of user equipment.

Step 8: A processor in the second operating environment obtains an event corresponding to the operation.

For a detailed description of the preset display area, refer to the detailed description in step 5. Details are not described herein again.

Likewise, description is provided by using an example in which the user enters a payment password of a numeric type. In step 8, the user enters the payment password in the preset display area.

Step 9: The processor determines whether the operation of the user on the UE is performed in the preset display area, and if it is determined that the operation of the user on the UE is performed in the preset display area, perform step 10, or if it is determined that the operation of the user on the UE is not performed in the preset display area, perform step 12.

Specifically, the user may perform an operation in a preset display area of a display unit, or may perform an operation outside the preset display area. A corresponding event generated by the operation of the user is transmitted to a secure core. The secure core determines whether the event is corresponding to an operation that falls in the preset display area. For example, the user enters the payment password in the preset display area, and the secure core determines whether a touch point of the user is in the preset display area. When the user triggers, for example, entering an account type (that is, performs an operation in the input area) during the foregoing operation, it is determined that the operation of the user is not performed in the preset display area; or when the user does not trigger entering an account type, it is determined that the operation of the user is performed in the preset display area. For example, the user is about to enter a payment password 12345678 by using the preset display area. When the user enters 123, the user equipment receives short message service message presentation or calling line identification presentation. If the user taps the short message service message presentation, the operation of the user on the user equipment at this time falls in a short message service message presentation box. In this case, it is determined that the operation of the user on the UE is not performed in the preset display area.

Step 10: Continue to receive an event generated when the user performs the operation on the user equipment in the preset display area.

Step 11: When it is determined that the user ends the operation, the processor performs verification processing on the received event, delivers the event to the first operating environment, and feeds back a verification processing result to the user.

For example, when the user ends entering the payment password, the received payment password is verified in the second operating environment, and a verification result is fed back to the user.

Step 12: When it is determined that the operation of the user on the user equipment is not performed in the preset display area, the processor delivers the event corresponding to the operation to the first operating environment for processing.

There may be two implementations of delivering the event corresponding to the operation to the first operating environment for processing.

Manner 1: An interrupt may be triggered to deliver the event corresponding to the operation to the first operating environment for processing.

In Manner 1, the processor may trigger an interrupt in the second operating environment, and store, by using the interrupt in the second operating environment, the event corresponding to the operation of the user in the shared storage area. In this case, in the monitor mode, the processor triggers an interrupt in the first operating environment, to deliver the event stored in the shared storage area to the first operating environment for processing.

For example, the processor triggers a fast interrupt request (Fast Interrupt Reques, FIQ), and stores the event corresponding to the operation of the user in the shared storage area. Then in the monitor mode, the processor triggers the interrupt in the first operating environment to obtain the event stored in the shared storage area. The interrupt in the first operating environment delivers the obtained event to the first operating environment for processing.

Manner 2: The event corresponding to the operation is delivered, by using a daemon thread, to the first operating environment for processing.

In Manner 2, a daemon process is a process with a relatively long lifetime, and is usually independent of the user equipment and periodically executes a task or waits to process an event that is to occur. The daemon process is usually started when the system is bootloaded, and ended when the system is disabled. In Manner 2, the processor may trigger an interrupt in the second operating environment, and store the event corresponding to the operation of the user in the shared storage area. Then in the monitor mode, the processor triggers an interrupt in the first operating environment, and triggers a daemon thread in the first operating environment by using the interrupt in the first operating environment. The daemon thread obtains the event stored in the shared storage area, and the daemon thread sends the obtained event to the first operating environment for processing.

In the foregoing two specific implementations of delivering the event corresponding to the operation to the first operating environment for processing, before the event is delivered, a current event needs to be stored in the shared storage area. In this case, the interrupt in the second operating environment may be triggered, and the event may be stored in the shared storage area by using the interrupt that runs in the second environment. Alternatively, a driver of the display unit may transmit the event to an upper-layer application, and the event may be stored in the shared storage area by using the upper-layer application.

Optionally, after delivering the event corresponding to the operation to the first operating environment for processing, the method further includes: hiding the preset display area.

For example, after entering 12345678, the user does not need to perform any other operation, and in this case, the processor hides the preset display area.

Figure 9:
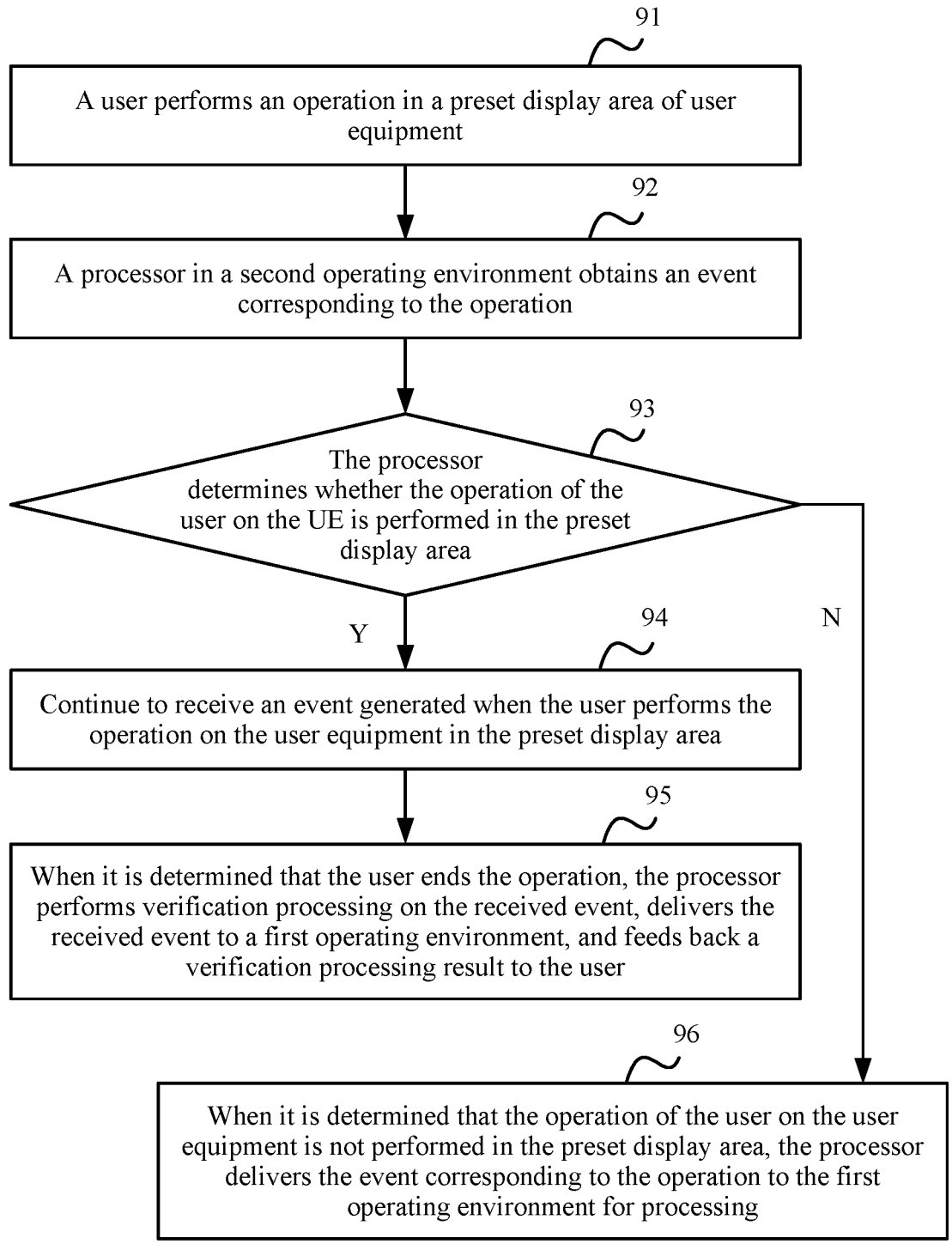
FIG. 9 is a flowchart of a data input method according to an embodiment of the present invention.

Correspondingly, an embodiment of the present invention further puts forward a data input method. As shown in FIG. 9, a specific processing procedure is as follows:

Step 91: A user performs an operation in a preset display area of user equipment.

Step 92: A processor in a second operating environment obtains an event corresponding to the operation.

For a detailed description of the preset display area, refer to the detailed description in step 5. Details are not described herein again.

Likewise, description is provided by using an example in which the user enters a payment password of a numeric type. The user enters the payment password in the preset display area.

Step 93: The processor determines whether the operation of the user on the UE is performed in the preset display area, and if it is determined that the operation of the user on the UE is performed in the preset display area, perform step 94, or if it is determined that the operation of the user on the UE is not performed in the preset display area, perform step 96.

Step 94: Continue to receive an event generated when the user performs the operation on the user equipment in the preset display area.

Step 95: When it is determined that the user ends the operation, the processor performs verification processing on the received event, delivers the received event to a first operating environment, and feeds back a verification processing result to the user.

For example, when the user ends entering the payment password, the received payment password is verified in the second operating environment, and a verification result is fed back to the user.

Step 96: When it is determined that the operation of the user on the user equipment is not performed in the preset display area, the processor delivers the event corresponding to the operation to the first operating environment for processing.

There may be two implementations of delivering the event corresponding to the operation to the first operating environment for processing.

Manner 1: An interrupt may be triggered to deliver the event corresponding to the operation to the first operating environment for processing.

In Manner 1, the processor may trigger an interrupt in the second operating environment, and store, by using the interrupt in the second operating environment, the event corresponding to the operation of the user in the shared storage area. In this case, in the monitor mode, the processor triggers an interrupt in the first operating environment, to deliver the event stored in the shared storage area to the first operating environment for processing.

For example, the processor triggers a fast interrupt request (Fast Interrupt Reques, FIQ), and stores the event corresponding to the operation of the user in the shared storage area. Then in the monitor mode, the processor triggers the interrupt in the first operating environment to obtain the event stored in the shared storage area. The interrupt in the first operating environment delivers the obtained event to the first operating environment for processing.

Manner 2: The event corresponding to the operation is delivered, by using a daemon thread, to the first operating environment for processing.

In Manner 2, a daemon process is a process with a relatively long lifetime, and is usually independent of the user equipment and periodically executes a task or waits to process an event that is to occur. The daemon process is usually started when the system is bootloaded, and ended when the system is disabled. In Manner 2, the processor may trigger an interrupt in the second operating environment, and store the event corresponding to the operation of the user in the shared storage area. Then in the monitor mode, the processor triggers an interrupt in the first operating environment, and triggers a daemon thread in the first operating environment by using the interrupt in the first operating environment. The daemon thread obtains the event stored in the shared storage area, and the daemon thread sends the obtained event to the first operating environment for processing.

In the foregoing two specific implementations of delivering the event corresponding to the operation to the first operating environment for processing, before the event is delivered, a current event needs to be stored in the shared storage area. In this case, the interrupt in the second operating environment may be triggered, and the event may be stored in the shared storage area by using the interrupt that runs in the second environment. Alternatively, a driver of the display unit may transmit the event to an upper-layer application, and the event may be stored in the shared storage area by using the upper-layer application.

Optionally, after delivering the event corresponding to the operation to the first operating environment for processing, the method further includes: hiding the preset display area.

For example, after entering 12345678, the user does not need to perform any other operation, and in this case, the processor hides the preset display area.

Figure 10:
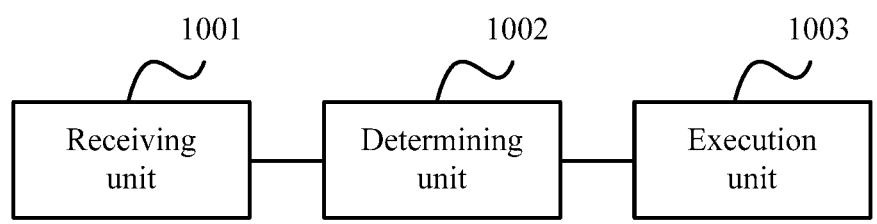
FIG. 10 is a schematic diagram of structural composition of a data input apparatus according to an embodiment of the present invention.

Correspondingly, an embodiment of the present invention further puts forward a data input apparatus. As shown in FIG. 10, structural composition of the apparatus includes:

a receiving unit 1001, configured to receive an event generated when a user performs an operation on UE in a preset display area;

a determining unit 1002, configured to determine whether the operation of the user on the UE is performed in the preset display area; and an execution unit 1003, configured to: when it is determined that the operation of the user on the UE is not performed in the preset display area, deliver an event corresponding to the operation to a first operating environment for processing.

The preset display area runs in a second operating environment of the UE, and the second operating environment has a higher security level than the first operating environment.

Optionally, in the foregoing apparatus, the execution unit 1003 is specifically configured to: store the event corresponding to the operation in a shared storage area, where the shared storage area is a storage area that is shared by the first operating environment and the second operating environment; and trigger an interrupt in the first operating environment, to deliver the event stored in the shared storage area to the first operating environment for processing.

Specifically, the execution unit 1003 is specifically configured to: trigger the interrupt in the first operating environment, and invoke a daemon thread in the first secure environment, so as to deliver, by using the daemon thread, the event stored in the shared storage area to the first operating environment for processing.

Specifically, the execution unit 1003 is further configured to: when it is determined that the event corresponding to the operation is a secure input event, display the preset display area, so that the user performs the operation in the preset display area. The secure input event is a data input event with an authority verification attribute.

Specifically, the execution unit 1003 is further configured to hide the preset display area after delivering the event corresponding to the operation to the first operating environment for processing.

Specifically, the preset display area includes an input edit box with a security attribute.

The present invention further provides a computer storage medium, configured to store a computer software instruction used by the data input apparatus according to the foregoing aspect. The computer software instruction includes a program designed to execute the foregoing aspect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data input method for a user equipment (UE) with a first operating environment and a second operating environment, where the second operating environment has a higher security level than the first operating environment, comprising:
   displaying a preset display area, wherein the preset display area runs in the second operating environment;
   receiving a second operation performed on the UE;
   storing, by the second operating environment, a second event corresponding to the second operation in a shared storage area in response to determining that the second operation is not performed in the preset display area, wherein the shared storage area is a storage area that is shared by the first operating environment and the second operating environment; and
   triggering an interrupt in the first operating environment, wherein the interrupt causes the second event stored in the shared storage area to be obtained by the first operating environment for processing.

2. The method according to claim 1, wherein the triggering an interrupt in the first operating environment comprises:
   triggering the interrupt in the first operating environment;
   invoking a daemon thread in the first operating environment; and
   delivering, by using the daemon thread, the second event stored in the shared storage area to the first operating environment for processing.

3. The method according to claim 1, wherein the method further comprises:
   displaying the preset display area when determining that a first event corresponding to a first operation is a secure input event, wherein the secure input event is a data input event with an authority verification attribute.

4. The method according to claim 1, wherein the preset display area comprises a formatted input edit box.

5. The method according to claim 1, wherein the method further comprises: hiding the preset display area.

6. The method according to claim 1, wherein the first operating environment is run in a first virtual core of a processor and the second operating environment is run in a second virtual core of the processor.

7. The method according to claim 6, wherein the first virtual core is a non-secure core, and the second virtual core is a secure core.

8. The method according to claim 3, wherein a content of the authority verification attribute is a password.

9. An apparatus, comprising:
   at least one processor; and
   one or more memory having computer readable instructions stored thereon that, when executed by the least one processor, cause the apparatus to:
   display a preset display area, wherein the preset display area runs in a second operating environment, wherein the apparatus comprises a first operating environment and the second operating environment, and the second operating environment has a higher security level than the first operating environment;
   receive a second operation performed on the apparatus;
   store, by the second operating environment, a second event corresponding to the second operation in a shared storage area in response to determining that the second operation is not performed in the preset display area, wherein the shared storage area is a storage area that is shared by the first operating environment and the second operating environment; and
   trigger an interrupt in the first operating environment, wherein the interrupt causes the second event stored in the shared storage area to be obtained by the first operating environment for processing.

10. The apparatus according to claim 9, wherein the apparatus is further caused to:
    trigger the interrupt in the first operating environment;
    invoke a daemon thread in the first operating environment; and
    deliver, by using the daemon thread, the second event stored in the shared storage area to the first operating environment for processing.

11. The apparatus according to claim 9, wherein the apparatus is further caused to:
    display the preset display area when determining that a first event corresponding to a first operation is a secure input event, wherein the secure input event is a data input event with an authority verification attribute.

12. The apparatus according to claim 9, wherein the apparatus is further caused to:
    hide the preset display area.

13. The apparatus according to claim 9, wherein the first operating environment is run in a first virtual core of a processor and the second operating environment is run in a second virtual core of the processor.

14. The apparatus according to claim 13, wherein the first virtual core is a non-secure core, and the second virtual core is a secure core.

15. The apparatus according to claim 11, wherein a content of the authority verification attribute is a password.

16. A non-transitory computer-readable storage medium, comprising computer-readable instructions stored thereon that, when executed by at least one processor, cause an apparatus to:
    display a preset display area, wherein the preset display area runs in a second operating environment, wherein the apparatus comprises a first operating environment and the second operating environment, and the second operating environment has a higher security level than the first operating environment;
    receive a second operation performed on the apparatus;

store, by the second operating environment, a second event corresponding to the second operation in a shared storage area in response to determining that the second operation is not performed in the preset display area, wherein the shared storage area is a storage area that is shared by the first operating environment and the second operating environment; and trigger an interrupt in the first operating environment, wherein the interrupt causes the second event stored in the shared storage area to be obtained by the first operating environment for processing.

17. The non-transitory storage medium according to claim 16, wherein the apparatus is further caused to:
trigger the interrupt in the first operating environment;
invoke a daemon thread in the first operating environment; and
deliver, by using the daemon thread, the second event stored in the shared storage area to the first operating environment for processing.

18. The non-transitory storage medium according to claim 16, wherein the apparatus is further caused to:
display the preset display area when determining that a first event corresponding to a first operation is a secure input event, wherein the secure input event is a data input event with an authority verification attribute.

19. The non-transitory storage medium according to claim 16, wherein the apparatus is further caused to: hide the preset display area.

* * * * *